US012726801B2

(12) United States Patent
Li et al.

(10) Patent No.: US 12,726,801 B2
(45) Date of Patent: Sep. 1, 2026

(54) METHOD FOR DATA TRANSMISSION, NETWORK DEVICE, TERMINAL DEVICE, AND SERVER DEVICE

(71) Applicant: ZTE CORPORATION, Shenzhen (CN)

(72) Inventors: Yuebao Li, Shenzhen (CN); Rong Wang, Shenzhen (CN); Xianglong Li, Shenzhen (CN); Chenggang Hu, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 296 days.

(21) Appl. No.: 18/693,632

(22) PCT Filed: May 7, 2022

(86) PCT No.: PCT/CN2022/091514

§ 371 (c)(1), (2) Date: Mar. 20, 2024

(87) PCT Pub. No.: WO2023/045343

PCT Pub. Date: Mar. 30, 2023

(65) Prior Publication Data

US 2024/0397297 A1 Nov. 28, 2024

(30) Foreign Application Priority Data

Sep. 26, 2021 (CN) .......................... 202111130091.7

(51) Int. Cl.

*H04W 4/70* (2018.01)
*H04W 4/08* (2009.01)
*H04W 76/11* (2018.01)

(52) U.S. Cl.

CPC ............... *H04W 4/70* (2018.02); *H04W 4/08* (2013.01); *H04W 76/11* (2018.02)

(58) Field of Classification Search

CPC ....... H04W 4/70; H04W 76/11; H04W 74/08; H04W 4/08; G06F 9/54; Y02D 30/70

See application file for complete search history.

(56) References Cited

U.S. PATENT DOCUMENTS 9,237,125 B1 * 1/2016 Bardgett ................ H04L 63/02
10,104,003 B1 10/2018 Savir et al.

(Continued)

FOREIGN PATENT DOCUMENTS

CN 110312296 A 10/2019
CN 113302861 A 8/2021

(Continued)

OTHER PUBLICATIONS

European Patent Office. Extended European Search Report for EP Application No. 22871404.4, mailed May 31, 2024, pp. 1-11.

(Continued)

*Primary Examiner* — Michael K Phillips
(74) *Attorney, Agent, or Firm* — Vivacqua Crane, PLLC

(57) ABSTRACT

A method for data transmission, a network device, a terminal device, and a server device are disclosed. The method may include receiving application data sent by a terminal device; where the application data corresponds to a grouping feature identifier; determining a corresponding first grouping session in the network device according to the grouping feature identifier; and sending the application data to the first grouping session, and sending the application data in the first grouping session to a corresponding second grouping session in the server device, such that the server device processes the application data.

19 Claims, 10 Drawing Sheets

(56) References Cited

U.S. PATENT DOCUMENTS

| | | | |
|---|---|---|---|
| 11,350,465 | B2 | 5/2022 | Fujishiro et al. |
| 2021/0051734 | A1 | 2/2021 | Chang et al. |
| 2021/0227586 | A1 | 7/2021 | Huang et al. |

FOREIGN PATENT DOCUMENTS

| | | | |
|---|---|---|---|
| JP | 2019186730 | A | 10/2019 |
| WO | 2019216370 | A1 | 11/2019 |
| WO | 2020132794 | A1 | 7/2020 |

OTHER PUBLICATIONS

3GPP Technical Specification Group Radio Access Network. "RACH based Small data transmission," 3GPP TSG-RAN WG2 Meeting #111, Aug. 2020, pp. 1-2, R2-2006845.

International Searching Authority. International Search Report and Written Opinion for PCT Application No. PCT/CN2022/091514 and English translation, mailed Jul. 29, 2022, pp. 1-10.

Japan Patent Office. Notice of Reasons for Refusal for JP Application No. 2024-509401 and English translation, mailed Feb. 18, 2025, pp. 1-8.

* cited by examiner

Figures 3, 4:
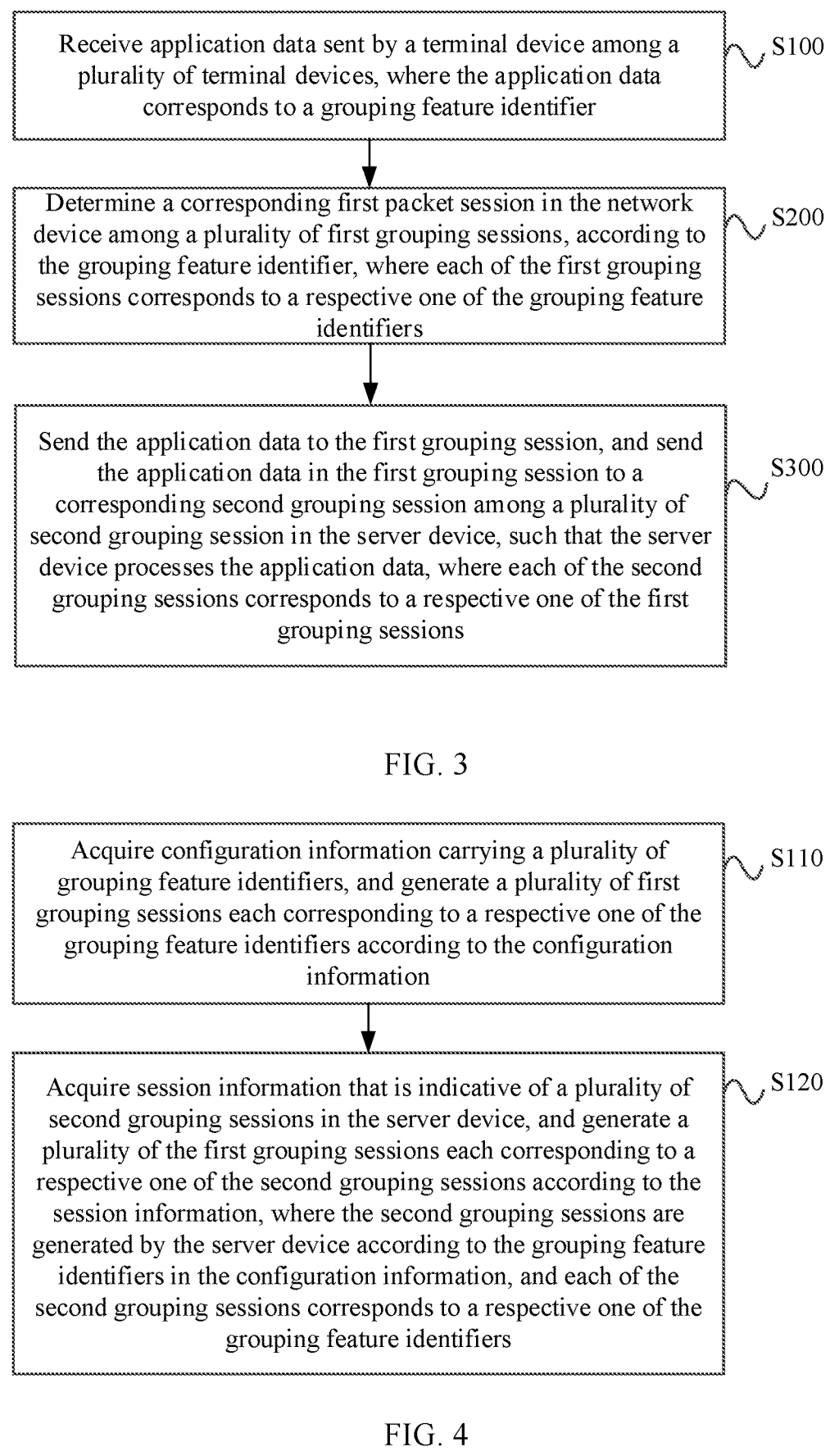

Receive application data sent by a terminal device among a plurality of terminal devices, where the application data corresponds to a grouping feature identifier

S100

Determine a corresponding first packet session in the network device among a plurality of first grouping sessions, according to the grouping feature identifier, where each of the first grouping sessions corresponds to a respective one of the grouping feature identifiers

S200

Send the application data to the first grouping session, and send the application data in the first grouping session to a corresponding second grouping session among a plurality of second grouping session in the server device, such that the server device processes the application data, where each of the second grouping sessions corresponds to a respective one of the first grouping sessions

Acquire configuration information carrying a plurality of grouping feature identifiers, and generate a plurality of first grouping sessions each corresponding to a respective one of the grouping feature identifiers according to the configuration information

S110

Acquire session information that is indicative of a plurality of second grouping sessions in the server device, and generate a plurality of the first grouping sessions each corresponding to a respective one of the second grouping sessions according to the session information, where the second grouping sessions are generated by the server device according to the grouping feature identifiers in the configuration information, and each of the second grouping sessions corresponds to a respective one of the grouping feature identifiers

Figures 5, 6, 7:
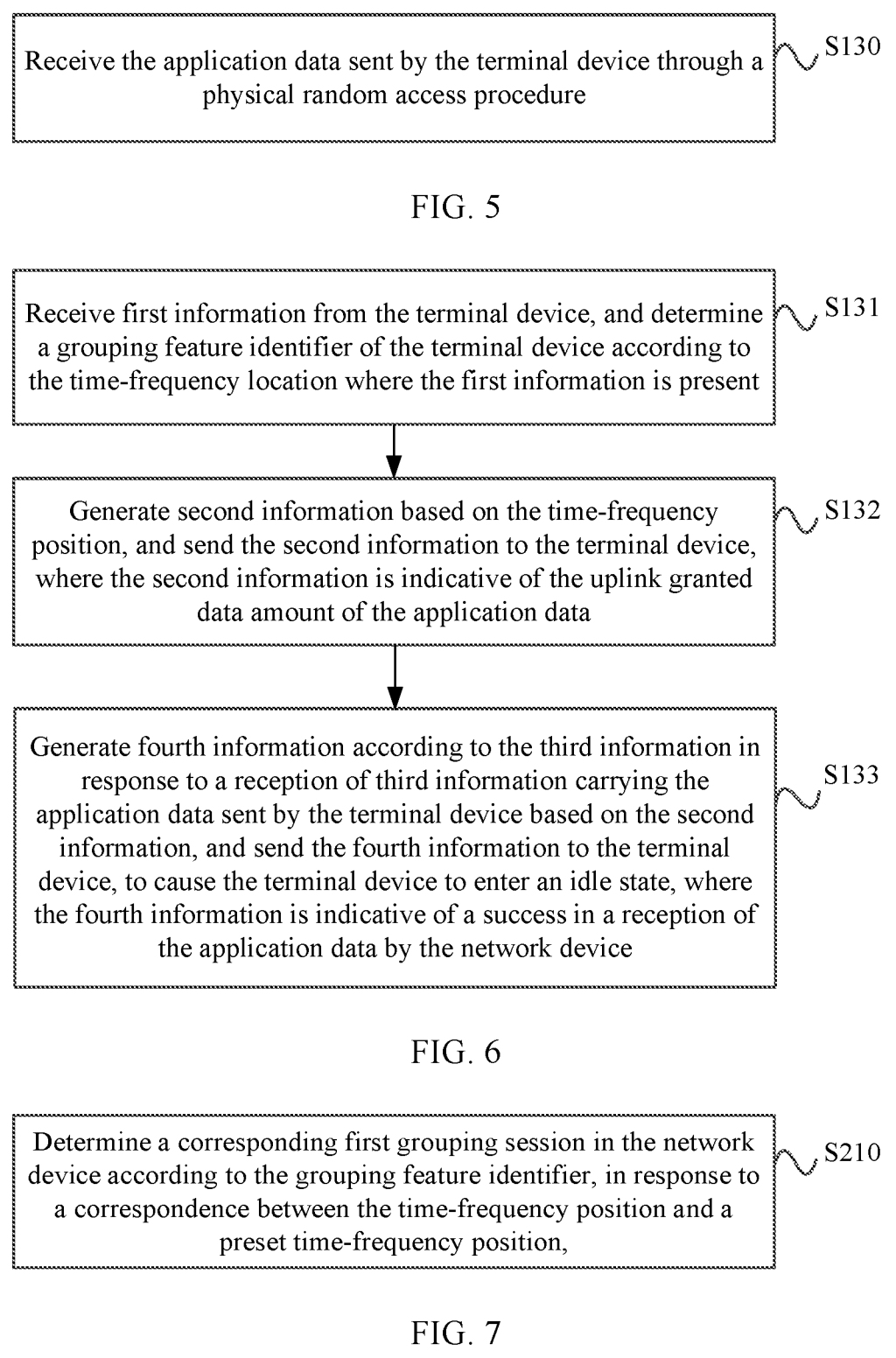

Receive the application data sent by the terminal device through a physical random access procedure

Receive first information from the terminal device, and determine a grouping feature identifier of the terminal device according to the time-frequency location where the first information is present

S131

Generate second information based on the time-frequency position, and send the second information to the terminal device, where the second information is indicative of the uplink granted data amount of the application data

S132

Generate fourth information according to the third information in response to a reception of third information carrying the application data sent by the terminal device based on the second information, and send the fourth information to the terminal device, to cause the terminal device to enter an idle state, where the fourth information is indicative of a success in a reception of the application data by the network device

Determine a corresponding first grouping session in the network device according to the grouping feature identifier, in response to a correspondence between the time-frequency position and a preset time-frequency position,

Figures 8, 9, 10:
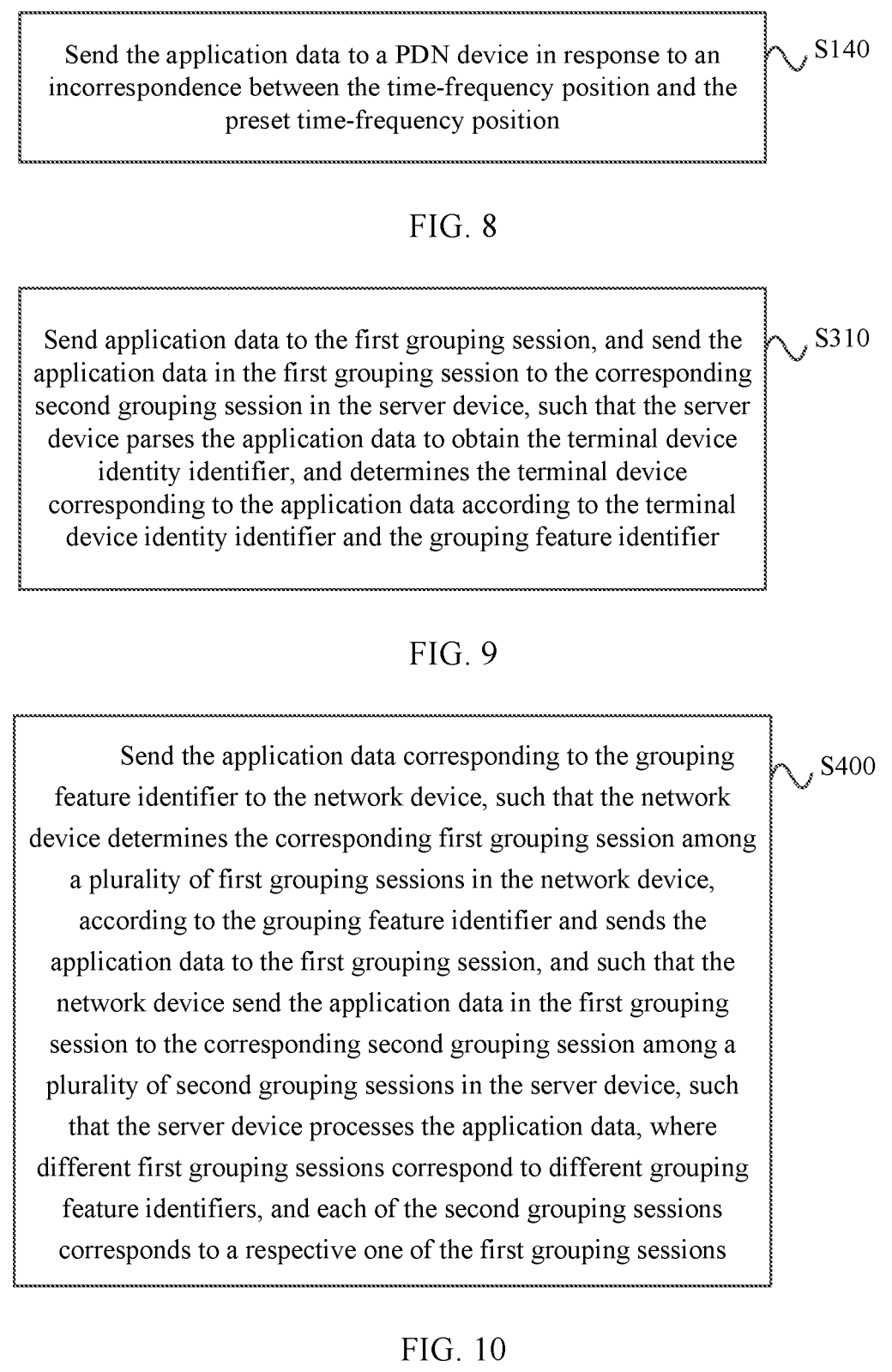

Send the application data to a PDN device in response to an incorrespondence between the time-frequency position and the preset time-frequency position

Send application data to the first grouping session, and send the application data in the first grouping session to the corresponding second grouping session in the server device, such that the server device parses the application data to obtain the terminal device identity identifier, and determines the terminal device corresponding to the application data according to the terminal device identity identifier and the grouping feature identifier

Send the application data corresponding to the grouping feature identifier to the network device, such that the network device determines the corresponding first grouping session among a plurality of first grouping sessions in the network device, according to the grouping feature identifier and sends the application data to the first grouping session, and such that the network device send the application data in the first grouping session to the corresponding second grouping session among a plurality of second grouping sessions in the server device, such that the server device processes the application data, where different first grouping sessions correspond to different grouping feature identifiers, and each of the second grouping sessions corresponds to a respective one of the first grouping sessions

Send the application data corresponding to the grouping feature identifier to the network device through a physical random-access procedure

METHOD FOR DATA TRANSMISSION, NETWORK DEVICE, TERMINAL DEVICE, AND SERVER DEVICE

This application is a national stage filing under 35 U.S.C. § 371 of international application number PCT/CN2022/091514, filed May 7, 2022, which claims priority to Chinese patent application No. 202111130091.7 filed Sep. 26, 2021. The contents of these applications are incorporated herein by reference in their entirety.

TECHNICAL FIELD

The present disclosure relates to the field of communication, and in particular to a method for data transmission, a network device, a terminal device, a server device, and a computer-readable storage medium.

BACKGROUND

Mass Machine Type Communication (MMTC) is one of the three scenarios of 5G defined by the International Telecommunication Union (ITU), especially for smart cities, environmental monitoring, smart agriculture, and other application prospects, which is characterized by small data, low power consumption and massive connection.

MMTC is primarily employed for large-scale data acquisition. In such a scenario, a huge number of terminal devices are widely distributed, with a small amount of data in a signal data transmission. Therefore, in addition to the requirement on the network for supporting ultra-large-scale user connections, the power consumption and cost during the use of a huge number of terminal devices shall be taken into consideration.

However, under the current networking scheme, the data transmission efficiency of terminal devices is low and the deployment cost is high due to the establishment of the bearer every time when data is sent. Meanwhile, the data transmission is constrained to the access and processing ability of the network side device, such that more bandwidth resources are taken and the network deployment cost is high.

SUMMARY

In order to at least alleviate the related issues, a method for data transmission, a network device, a terminal device, a server device, and a computer-readable storage medium are provided in some embodiments of the present disclosure. Thereby, rapid data collection of massive terminal devices and reduction in the deployment cost of terminal devices and network-side devices are achieved.

According to an embodiment of the present disclosure, there is provided a method for data transmission, applied to a network device in communicative connection with a plurality of terminal devices and a server device, the method may include, receiving application data sent by a terminal device among the terminal devices; where the application data corresponds to a grouping feature identifier among a plurality of grouping feature identifiers; determining a corresponding first grouping session among a plurality of first grouping sessions in the network device according to the grouping feature identifier; where each of the first grouping sessions corresponds to a respective one of the grouping feature identifiers; and sending the application data to the first grouping session, and sending the application data in the first grouping session to a corresponding second grouping session among a plurality of second grouping sessions in the server device, such that the server device processes the application data; where each of the second grouping sessions corresponds to a respective one of the first grouping sessions.

According to another embodiment of the present disclosure, there is provided a method for data transmission, applied to a terminal device among a plurality of terminal devices in communicative connection with a server device through a network device, the method may include, sending application data corresponding to a grouping feature identifier among a plurality of grouping feature identifiers to the network device, such that the network device determines the corresponding first grouping session among a plurality of first grouping sessions in the network device according to the grouping feature identifier, and sends the application data to the first grouping session, and such that the network device sends the application data in the first grouping session to a corresponding second grouping session among a plurality of second grouping sessions in the server device, such that the server device processes the application data; where each of the first grouping sessions corresponds to a respective one of the grouping feature identifiers, and each of the second grouping sessions corresponds to a respective one of the first grouping sessions.

According to yet another embodiment of the present disclosure, there is provided a method for data transmission, applied to a server device in communicative connection with a plurality of terminal devices through a network device, the method may include: receiving application data in a first packet session among a plurality of first packet sessions from the network device; where the application data is sent by the terminal device and corresponds to a grouping feature identifier among a plurality of grouping feature identifiers, and each of the first grouping sessions corresponding to a respective one of the grouping feature identifiers; and sending the application data to a second grouping session among a plurality of second grouping sessions, where the second grouping session corresponds to the first grouping session, and processing the application data; where each of the second grouping sessions corresponds to a respective one of the first grouping sessions.

According to yet another embodiment of the present disclosure, there is provided a network device, which may include a memory, a processor, and a computer program stored in the memory and executable by the processor which, when executed by the processor, causes the processor to carry the method applied to the network device as described above.

According to yet another embodiment of the present disclosure, there is provided a terminal device, which may include a memory, a processor, and a computer program stored in the memory and executable by the processor which, when executed by the processor, causes the processor to carry out the method applied to the terminal device as described above.

According to yet another embodiment of the present disclosure, there is provided a server device, which may include a memory, a processor, and a computer program stored in the memory and executable by the processor which, when executed by the processor, causes the processor to carry out the method applied to the server device as described above.

According to yet another embodiment of the present disclosure, there is provided a computer-readable storage medium storing thereon a computer-executable instruction which, when executed by a processor, causes the processor to carry out the method applied to the network device or the terminal device as described above.

Other features and advantages of the present disclosure will be illustrated in the following description, and in part will be apparent from the description, or may be understood by practicing the present disclosure. The objects and other advantages of the present disclosure can be achieved and obtained by the structure particularly set forth in the description, claims, and drawings.

BRIEF DESCRIPTION OF DRAWINGS

Additional features and advantages of the present disclosure will be set forth in the subsequent description, and in part will become apparent from the description in conjunction with the drawings.

FIG. 3 depicts a flowchart showing a method for data transmission according to an embodiment of the present disclosure;

FIG. 4 depicts a flowchart showing a method for data transmission according to another embodiment of the present disclosure;

FIG. 5 depicts a flowchart showing a method for data transmission according to yet another embodiment of the present disclosure;

FIG. 6 depicts a flowchart showing a method for data transmission according to yet another embodiment of the present disclosure;

FIG. 7 depicts a flowchart showing a method for data transmission according to yet another embodiment of the present disclosure;

FIG. 8 depicts a flowchart showing a method for data transmission according to yet another embodiment of the present disclosure;

FIG. 9 depicts a flowchart showing a method for data transmission according to yet another embodiment of the present disclosure;

FIG. 10 depicts a flowchart showing a method for data transmission according to yet another embodiment of the present disclosure;

FIG. 13 depicts a flowchart showing a method for data transmission according to yet another embodiment of the present disclosure;

FIG. 14 depicts a flowchart showing a method for data transmission according to yet another embodiment of the present disclosure;

FIG. 15 depicts a flowchart showing a method for data transmission according to yet another embodiment of the present disclosure;

DETAILED DESCRIPTION

Figure 1:
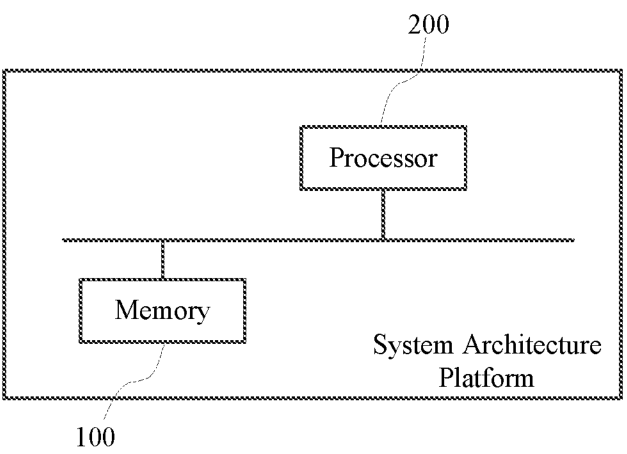
FIG. 1 depicts a schematic diagram showing a system architecture platform in which a method for data transmission according to an embodiment of the present disclosure may be carried out.

The purpose, technical scheme, and advantages of the present disclosure will become apparent through the following description for various embodiments in conjunction with the drawings. It should be understood that the embodiments described here are intended for illustration but not limitation to the present disclosure.

It should be noted that although the devices are shown with individual functional modules in the schematic diagram and the logical sequences are shown in the flow chart, in some cases, the devices can have different modules than those shown and the steps can be executed in a different order than those shown. The terms "first" and "second", if used in the description, claims, and drawings are intended to distinguish similar objects, and do not necessarily imply any specific order or sequence.

Mass Machine Type Communication (MMTC) is one of the major three scenarios of 5G defined by the International Telecommunication Union (ITU), especially for smart cities, environmental monitoring, smart agriculture, and other application prospects, which is characterized by small data, low power consumption, and a huge number of connections.

MMTC is primarily employed for large-scale data acquisition. In such a scenario, a huge number of terminal devices are widely distributed, with a small amount of data in a signal data transmission. Therefore, in addition to the requirement on the network for supporting ultra-large-scale user connections, the power consumption and cost during the use of a huge number of terminal devices shall be taken into consideration.

However, in the current networking mode, a terminal device has to establish a bearer every time when sending data, which leads to the following issues in the scenario.

1) The amount of transmitted data and signaling data is mismatched, and the transmission efficiency is low.
2) The access and processing capacity from the network-side device limits the amount of accessing terminal devices in the same time period. The increase in the amount of accessing terminal devices, would simply result from the increase in the amount of the network-side devices to improve the system capacity, which leads to a higher cost of network deployment.
3) A terminal device needs to establish a bearer every time for data transmission, such that the terminal device has to support a complete protocol stack. Thus, the implementation complexity and power consumption of the terminal device, and the deployment cost of a single terminal device are increased.
4) The terminal device requires a lot of time-frequency resources to establish the bearer. In the scenario of deployment of a huge number of terminal devices, the network-side device and terminal device have to support large system bandwidth, which puts forward higher requirements for the application of spectrum resources and network optimization of the devices.

In view of this, a method for data transmission, a network device, a terminal device, a server device, and a computer-readable storage medium are provided in some embodiments of the present disclosure. Thereby, rapid data collection of massive terminal devices and reduction in the deployment cost of terminal devices and network-side devices are achieved.

Some embodiments of the present disclosure will be further illustrated with reference to the drawings.

FIG. 1 depicts a schematic diagram showing a system architecture platform in which a method for data transmission according to an embodiment of the present disclosure is carried out.

In the embodiment shown in FIG. 1, the system architecture platform is provided with a processor 200 and a memory 100 connected by a bus or other means. The connection is shown as a bus by way of an example in FIG. 1.

As a non-transitory computer-readable storage medium, the memory 100 can be configured to store non-transitory software programs and non-transitory computer-executable programs. In addition, the memory 100 may include high-speed random-access memory 100 and non-transitory memory 100, such as at least one disk memory device 100, flash memory device, or other non-transitory solid-state memory devices 100. In some embodiments, the memory 100 may include the storage 100 remotely arranged with respect to the processor 200, and the remote storage 100 may be connected to the system architecture platform through a network. Examples of the above networks include, but are not limited to, the Internet, intranet, local area network, mobile communication network, and combinations thereof.

It can be understood by those having ordinary skills in the art that the system architecture platform can be applied to 5G communication network systems, subsequently evolved mobile communication network systems, or the like, and this embodiment is not limited thereto.

It can be understood by those having ordinary skills in the art that the system architecture platform shown in FIG. 1 does not constitute a limitation to the embodiment of the present disclosure, and may include more or fewer components than those shown, or some components may be combined, or have different component arrangements.

In the system architecture platform shown in FIG. 1, the processor 200 can call the controlling program stored in the memory 100 to carry out the method for data transmission.

Based on the hardware structure of the above system architecture platform, some embodiments of a system for data transmission are proposed.

Figure 2:
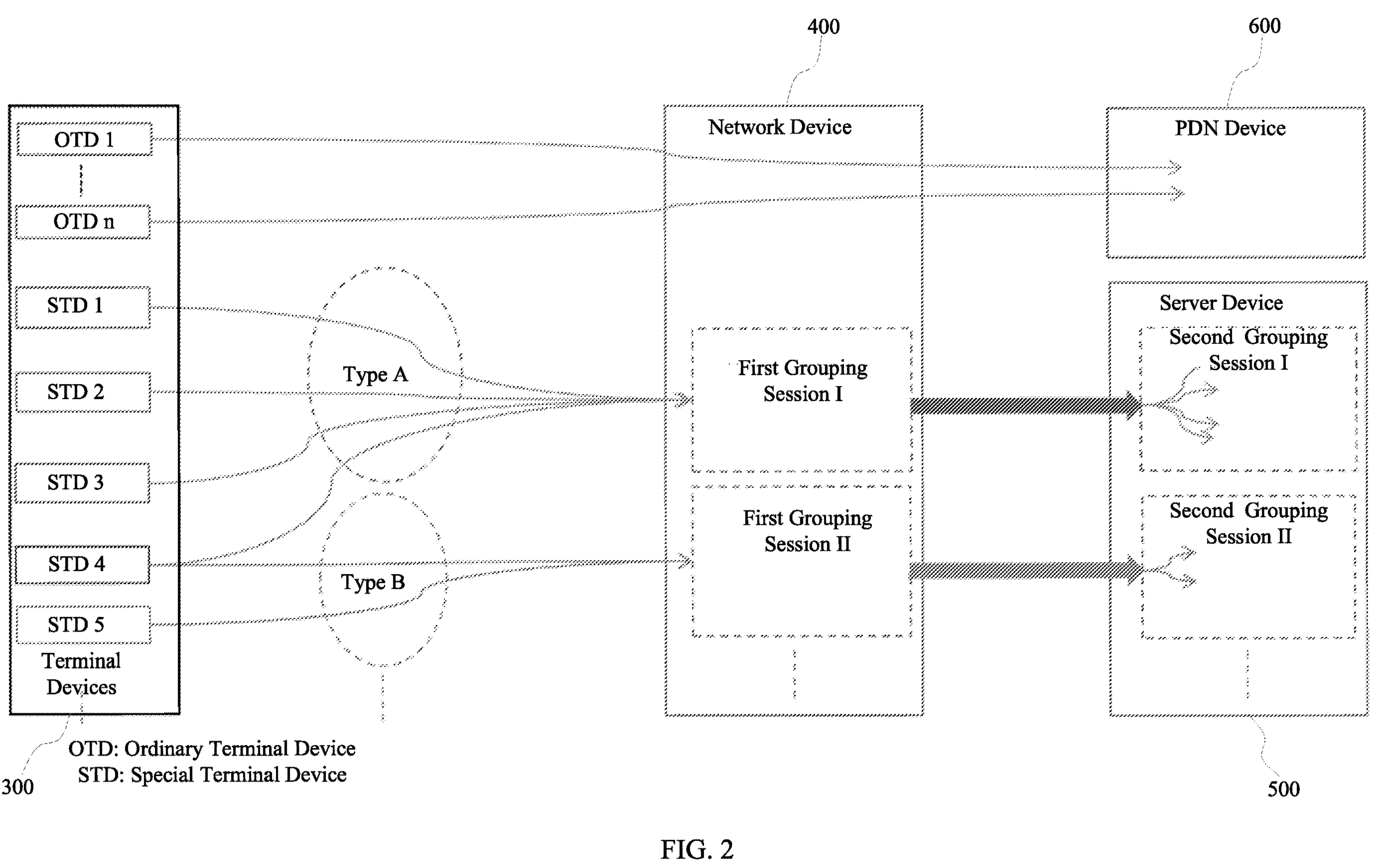
FIG. 2 depicts a schematic diagram showing the networking in which a method for data transmission according to an embodiment of the present disclosure may be carried out.

Referring to FIG. 2, the system includes, but is not limited to, a terminal device 300, a network device 400, and a server device 500. The network device 400 is in communicative connection with the terminal device 300 and the server device 500. Each of the terminal devices 300, the network device 400, and the server device 500 can include the memory 100 and the processor 200 as shown in FIG. 1.

It should be noted that the server device 500 may be physically independent from the network device 400. Alternatively, the server device 500 and the network device 400 may be integrated, and this embodiment is not limited thereto.

Based on the module and hardware structure of the above system, some embodiments of the method for data transmission according to a first aspect of the present disclosure are presented below.

FIG. 3 depicts a flowchart showing a method for data transmission according to an embodiment of the present disclosure. The method is applied to a system for data transmission. As shown in FIG. 3, the method includes but is not limited to operations S100, S200, and S300.

At operation S100, application data sent by a terminal device 300 among a plurality of terminal devices 300 is received, where the application data corresponds to a grouping feature identifier.

It should be noted that the grouping feature identifier is predefined in the terminal device 300 by a user.

It should be noted that the grouping feature identifier is the grouping feature identifier corresponding to the current application data, among a plurality of grouping feature identifiers.

It should be noted that the grouping feature identifier can be carried by the application data, or can be obtained according to a relationship between the time-frequency position of the transmitted application data and the preset groupings, and this embodiment is not limited thereto.

At operation S200, a corresponding first grouping session in the network device 400 is determined among a plurality of first grouping sessions, according to the grouping feature identifier, where each of the first grouping sessions corresponds to a respective one of the grouping feature identifiers.

It should be noted that the grouping feature identifiers have a one-to-one correspondence with the first grouping session. The first grouping session is equivalent to a common grouping session, with each first grouping session including several sets of application data carrying the same grouping feature identifier.

At operation S300, the application data is sent to the first grouping session, and the application data in the first grouping session is sent to a corresponding second grouping session among a plurality of second grouping sessions in the server device 500, such that the server device 500 processes the application data, where each of the second grouping sessions corresponds to a respective one of the first grouping sessions.

It should be noted that different first grouping sessions correspond to different second grouping sessions. The second grouping sessions are also equivalent to common grouping sessions. In an embodiment, the network device 400 sends several sets of application data corresponding to the same grouping feature identifier included in the first grouping session to the same second grouping session in the server device 500.

In an embodiment, through operations S100 to S300, the network device 400 receives the application data sent by the terminal device 300, then determines the first grouping session corresponding to the application data according to the grouping feature identifier corresponding to the application data, and then sends the application data to the first grouping session, and sends the application data in the first grouping session to the corresponding second grouping session in the server device 500, such that the server device 500 processes these application data.

It can be understood that, according to the technical scheme of an embodiment of the present disclosure, the method for data transmission provides a brand-new method for rapid data collection from a wide range of data sources each having a small amount of data. On the basis of predefined types, the network device 400 establishes a common grouping session for each type, instead of establishing a data collection entity with each data source. Thus, the maintenance of the sessions of the network-side device is significantly reduced, and the access and processing capability of the network-side device is thereby enhanced.

Meanwhile, in this method, the underlying physical random-access channel is employed without the establishment of the high-level bearer to realize effective data transmission. Thus, the system complexity is simplified, the requirements for the system to deploy time-frequency resources are lowered, and an effective way to deploy a huge amount of sensors at a low cost is provided. Since the data can be reported in the random-access procedure, the demand for a large number of time-frequency resources to establish the bearer, is eliminated. As such, the network-side device and the terminal device 300 can support the deployment of a huge number of terminal devices without large system bandwidth, which is of great significance in the 5G era.

In addition, the method can be easily extended with the existing wireless network system and easily compatible with the existing network side device, thus the cost can be greatly reduced and the flexibility of network deployment is increased.

Referring to FIG. 4, before the above operation S100, the method includes but is not limited to one of the following operations S110 and S120.

At operation S110, configuration information carrying a plurality of grouping feature identifiers is acquired, and a plurality of first grouping sessions each corresponding to a respective one of the grouping feature identifiers are generated according to the configuration information.

It should be noted that the configuration information carries a plurality of grouping feature identifiers. The network device 400 generates a plurality of first grouping sessions each corresponding to a respective one of the grouping feature identifiers according to the plurality of grouping feature identifiers.

At operation S120, session information that is indicative of a plurality of second grouping sessions in the server device 500 is acquired, and a plurality of the first grouping sessions each corresponding to a respective one of the second grouping sessions are generated according to the session information, where the second grouping sessions are generated by the server device 500 according to the grouping feature identifiers in the configuration information, and each of the second grouping sessions corresponds to a respective one of the grouping feature identifiers.

In an embodiment, within the network device 400, a plurality of first grouping sessions each corresponding to a respective one of the grouping feature identifiers are preset. Similarly, within the server device 500, a plurality of second grouping sessions each corresponding to a respective one of the grouping feature identifiers are preset. That is, each of the preset first grouping sessions corresponds to a respective one of the second grouping sessions. Therefore, when the first grouping sessions are preset in the network device 400, the corresponding configuration information can be preset by a user in the back end. Alternatively, the first grouping sessions can be generated correspondingly from the second grouping sessions configured in the server device 500, and this embodiment is not limited thereto.

Referring to FIG. 5, the above operation S100 includes but is not limited to the following operation S130.

At operation S130, the application data sent by the terminal device 300 is received through a physical random-access procedure.

In an embodiment, the terminal device 300 transmits information to the network device 400 through an Early Data Transmission (EDT) technology, i.e., over a Physical Random-Access Channel (PRACH), such that the application data can be transmitted without establishing a bearer between each terminal device 300 and the network device 400.

Referring to FIG. 6, the above operation S130 includes but is not limited to the following operations S131, S132, and S133.

At operation S131, first information is received from the terminal device 300, and a grouping feature identifier of the terminal device 300 is determined according to the time-frequency location where the first information is present.

At operation S132, second information is generated based on the time-frequency position and is sent to the terminal device 300, where the second information is indicative of the uplink granted data amount of the application data.

At operation S133, in response to a reception of third information carrying the application data sent by the terminal device 300 based on the second information, fourth information is generated according to the third information, and the fourth information is sent to the terminal device 300, to cause the terminal device 300 to enter an idle state, where the fourth information is indicative of a success in a reception of the application data by the network device 400.

In an embodiment, the terminal device 300 and the network device 400 quickly collect data through the EDT technology. Before sending application data, the terminal device 300 first sends the first information to the network device 400. The network device 400 determines the time-frequency position of the terminal device 300 in the physical random access channel according to the first information, thus quickly identifying whether the application data sent by the terminal device 300 should be allocated to the first grouping session. Then, the network device 400 generates the second information based on the first information according to the size of the data amount corresponding to the predefined different data classifications, and sends the second information to the terminal device 300, thereby designating the uplink granted data amount of the application data. Subsequently, the terminal device 300 feeds back the third information carrying the application data to the network device 400 according to the grant designation of the second information. When successfully receiving the application data, the network device 400 generates the fourth information based on the third information, and sends the fourth information to the terminal device 300 to cause the terminal device 300 to enter an idle state, such that the duration of the EDT procedure is shortened, thereby reducing the energy consumed by the terminal device 300.

Referring to FIG. 7, the above operation S200 includes but is not limited to the following operation S210.

At operation S210, in response to a correspondence between the time-frequency position and a preset time-frequency position, a corresponding first grouping session in the network device 400 is determined according to the grouping feature identifier.

In an embodiment, when the time-frequency position of the first information sent by the terminal device 300 corresponds to the preset time-frequency position reserved by the network device 400, the first grouping session corresponding to the terminal device 300 is determined according to the grouping feature identifier.

It should be noted that different time-frequency positions can correspond to different preset time-frequency positions, and different preset time-frequency positions correspond to different first grouping sessions one by one, such that the first grouping session corresponding to the application data can be determined according to the time-frequency position of the first information sent by the terminal device 300.

Referring to FIG. 8, after the above operation S100, the method includes but is not limited to the following operation S140.

At operation S140, in response to a lack of correspondence (not corresponding) between the time-frequency position and the preset time-frequency position, the application data is sent to a public data network (PDN) device 600.

In an embodiment, when the time-frequency position of the first information sent by the terminal device 300 does not correspond to the preset time-frequency position reserved by the network device 400, the application data of the terminal device 300 is sent to the PDN device.

Referring to FIG. 9, each application data carries a terminal device identity identifier corresponding to one of the terminal devices 300. After the above operation S300, the method includes but is not limited to the following operation S310.

At operation S310, the application data is sent to the first grouping session, and the application data in the first grouping session is sent to the corresponding second grouping session in the server device 500, such that the server device 500 parses the application data to obtain the terminal device identity identifier, and determines the terminal device 300 corresponding to the application data according to the terminal device identity identifier and the grouping feature identifier.

In an embodiment, the network device 400 sends the application data in the first grouping session to the second grouping session of the server device 500. Then the server device 500 determines the terminal device 300 corresponding to the application data according to the terminal device identity identifier carried in the application data corresponding to the terminal device 300, and then collects these application data, so as to accurately correspond the application data with the terminal device 300 and reduce the deployment cost of a single terminal device 300.

Based on the module and hardware structure of the above system for data transmission and the method for data transmission of the first aspect, embodiments of the method for data transmission of the second aspect of the present disclosure are proposed below.

FIG. 10 depicts a flowchart showing a method for data transmission according to yet another embodiment of the present disclosure. The method is applied to a system for data transmission. As shown in FIG. 10, the method includes but is not limited to operation S400.

At operation S400, the application data corresponding to the grouping feature identifier is sent to the network device 400, such that the network device 400 determines the corresponding first grouping session among a plurality of first grouping sessions in the network device 400, according to the grouping feature identifier and sends the application data to the first grouping session, and such that the network device 400 sends the application data in the first grouping session to the corresponding second grouping session among a plurality of second grouping sessions in the server device 500, such that the server device 500 processes the application data, where each of the first grouping sessions corresponds to a respective one of the grouping feature identifiers, and each of the second grouping sessions corresponds to a respective one of the first grouping sessions.

In an embodiment, the terminal device 300 sends the application data corresponding to the grouping feature identifier to the network device 400, such that the network device 400 determines the corresponding first grouping session according to the grouping feature identifier, and then sends the application data to the first grouping session, and the network device sends the application data in the first grouping session to the corresponding second grouping session in the server device 500, such that the server device 500 processes the application data.

It can be understood that, according to the technical scheme set forth in some embodiment of the present disclosure, common grouping sessions are provided, thus eliminating the need for establishing a bearer between each terminal device 300 and the network-side device. Thereby, data from massive terminal devices 300 can be quickly collected and the deployment cost of the terminal devices 300 and the network-side device can be reduced.

Figures 11, 12:
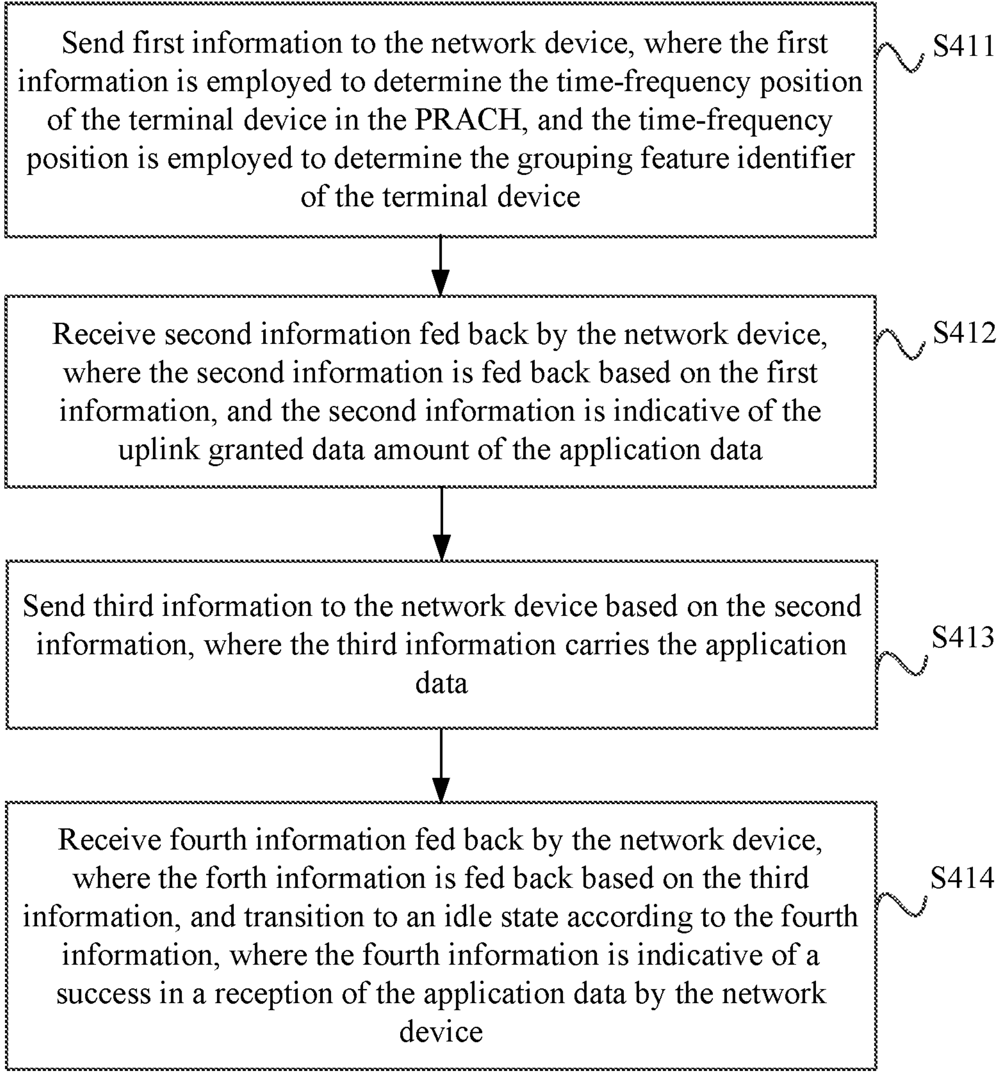
FIG. 11 depicts a flowchart showing a method for data transmission according to yet another embodiment of the present disclosure.
FIG. 12 depicts a flowchart showing a method for data transmission according to yet another embodiment of the present disclosure.

Referring to FIG. 11, the above operation S400 includes but is not limited to the following operation S410.

At operation S410, the application data corresponding to the grouping feature identifier is sent to the network device 400 through a physical random-access procedure.

In an embodiment, the terminal device 300 transmits information to the network device 400 through the EDT technology, i.e., over a PRACH, such that the application data can be transmitted without establishing a bearer between each terminal device 300 and the network device 400.

Referring to FIG. 12, the above operation S410 includes but is not limited to the following operations S411, S412, S413, and S414.

At operation S411, first information is sent to the network device 400, where the first information is employed to determine the time-frequency position of the terminal device 300 in the PRACH, and the time-frequency position is employed to determine the grouping feature identifier of the terminal device 300.

At operation S412, second information fed back by the network device 400 is received, where the second information is fed back based on the first information, and the second information is indicative of the uplink granted data amount of the application data.

At operation S413, third information is sent to the network device 400 based on the second information, where the third information carries the application data.

At operation S414, fourth information fed back by the network device 400 is received, where the fourth information is fed back based on the third information, and an entrance to an idle state is carried out according to the fourth information, where the fourth information is indicative of a success in a reception of the application data by the network device 400.

In an embodiment, rapid data collection is conducted between the terminal device 300 and the network device 400 through the EDT technology. Before sending application data, the terminal device 300 first sends the first information to the network device 400. The network device 400 determines the time-frequency position of the terminal device 300 in the physical random-access channel according to the first information, thus quickly identifying whether the application data sent by the terminal device 300 should be sent to the first grouping session. Then, the network device 400 generates the second information based on the first information according to the size of the data amount corresponding to the predefined different data types, and sends the second information to the terminal device 300, thereby designating the uplink granted data amount of the application data. Subsequently, the terminal device 300 sends the third information carrying the application data to the network device 400 according to the grant designation of the second information. When successfully receiving the application data, the network device 400 generates the fourth information based on the third information and sends the fourth information to the terminal device 300, such that the terminal device 300 enters an idle state according to the fourth information.

Figures 13, 14, 15:
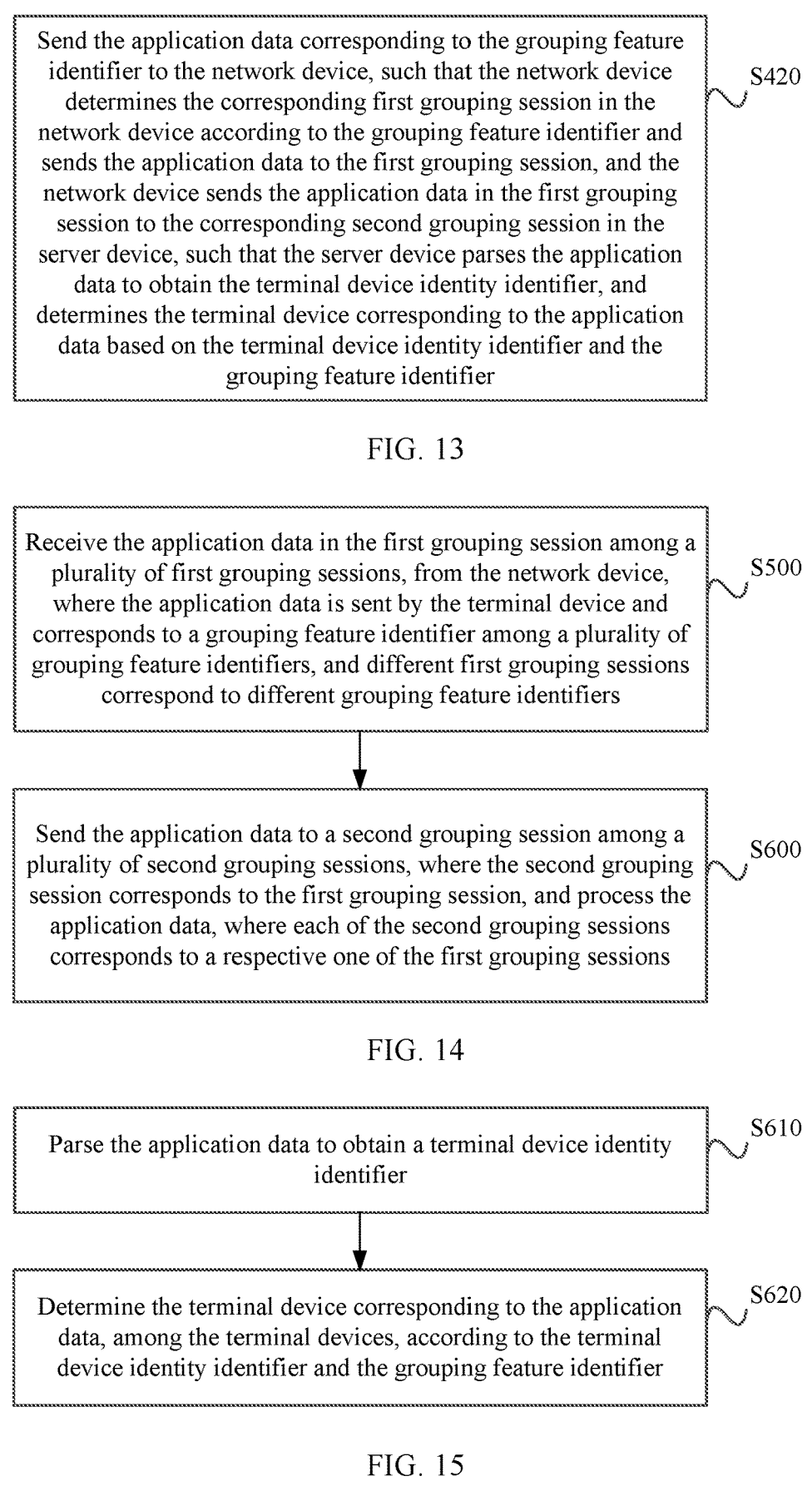

In an embodiment, each application data carries a terminal device identity identifier corresponding to one of the terminal devices 300. Referring to FIG. 13, the above operation S400 includes but is not limited to the following operation S420.

At operation S420, the application data corresponding to the grouping feature identifier is sent to the network device 400, such that the network device 400 determines the corresponding first grouping session in the network device 400 according to the grouping feature identifier and sends the application data to the first grouping session, and the network device 400 sends the application data in the first grouping session to the corresponding second grouping session in the server device 500, such that the server device 500 parses the application data to obtain the terminal device identity identifier, and determines the terminal device 300 corresponding to the application data based on the terminal device identity identifier and the grouping feature identifier.

In an embodiment, the terminal device 300 sends the application data corresponding to the grouping feature identifier to the network device 400. Then the network device 400 sends the application data in the first grouping session to the second grouping session of the server device 500. Then the server device 500 determines the terminal device 300 corresponding to the application data according to the terminal device identity identifier carried in the application data corresponding to the terminal device 300, and then collects these application data, so as to accurately correspond the application data with the terminal device 300 and reduce the deployment cost of a single terminal device 300.

Based on the module and hardware structure of the above system for data transmission and the method for data transmission of the first and second aspects, embodiments of the method for data transmission of the third aspect of the present disclosure are proposed below.

FIG. 14 depicts a flowchart showing a method for data transmission according to yet another embodiment of the present disclosure. The method is applied to a system for data transmission. As shown in FIG. 14, the method includes but is not limited to operations S500 and S600.

At operation S500, the application data in the first grouping session among a plurality of first grouping sessions, is received from the network device 400, where the application data is sent by the terminal device 300 and corresponds to a grouping feature identifier among a plurality of grouping feature identifiers, and each of first grouping sessions correspond to a respective one of grouping feature identifiers.

At operation S600, the application data is sent to a second grouping session among a plurality of second grouping sessions, where the second grouping session corresponds to the first grouping session, and the application data is processed, where each of the second grouping sessions corresponds to a respective one of the first grouping sessions.

In an embodiment, the server device 500 receives the application data in the first grouping session from the network device 400. Since these application data correspond to the grouping feature identifiers, the server device 500 sends these application data to the second grouping sessions in the server device 500 corresponding to the first grouping sessions according to the grouping feature identifiers, and then processes these application data.

It can be understood that, according to the technical scheme set forth in some embodiment of the present disclosure, common grouping sessions are provided, thus eliminating the need for establishing a bearer between each terminal device 300 and the network-side device. Thereby, data from a large amount of terminal devices 300 can be quickly collected and the deployment cost of the terminal devices 300 and the network-side device can be reduced.

In an embodiment each application data carries a terminal device identity identifier corresponding to one of the terminal devices 300. Referring to FIG. 15, the above operation S600 includes but is not limited to the following operations S610 and S620.

At operation S610, application data is parsed to obtain a terminal device identity identifier.

At operation S620, the terminal device 300 corresponding to the application data is determined among the terminal devices 300, according to the terminal device identity identifier and the grouping feature identifier.

In an embodiment, the server device 500 determines the terminal device 300 corresponding to the application data according to the terminal device identity identifier corresponding to the terminal device 300 carried in the application data, and then collects these application data, so as to accurately establish a correspondence between an application data and the terminal device 300 and reduce the deployment cost of a single terminal device 300.

Based on the method for data transmission of the first aspect, the second aspect, and the third aspect described above, an overall embodiment of the method for data transmission is illustrated below.

Figure 16:
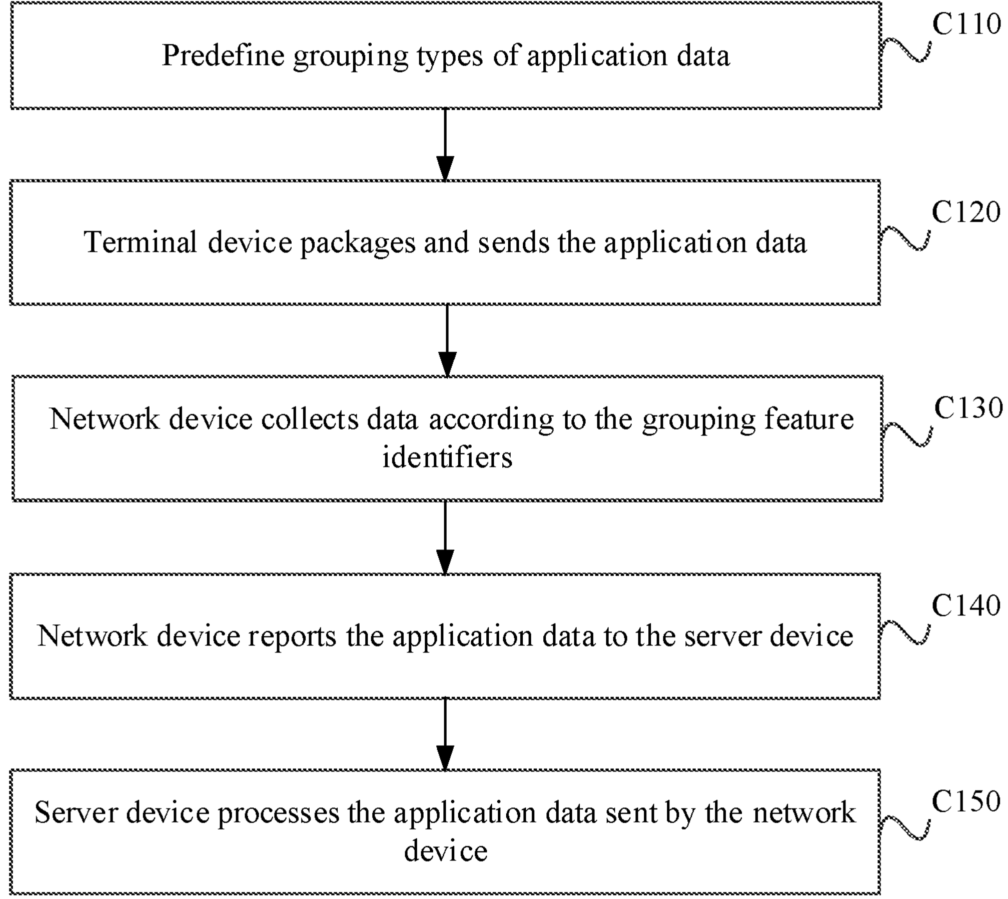
FIG. 16 depicts a general flowchart showing a method for data transmission according to yet another embodiment of the present disclosure.

Referring to FIGS. 2 and 16, the method for data transmission is applied to a system for data transmission. The method includes but is not limited to the following operations C110 to C160.

At operation C110, grouping types of application data are predefined.

In an embodiment, the application data to be collected and reported are divided into several types in advance. For example, it is predefined that the type of collected temperature data is type A, the type of the collected pressure data is type B, the collected speed information is type C, etc., and this embodiment is not limited thereto.

Each special terminal device initially predefines one or several types of application data to be collected, and maps each type of data to a set of protocol stack predefined parameters. For example, data of type A correspond to protocol stack X, data of type B correspond to protocol stack Y, data of type C correspond to protocol stack Z, etc, and this embodiment is not limited thereto. It should be noted that for a wireless system, the protocol stack includes physical resource preset definitions that are not limited to the broadcast of network cells.

The network device 400 adds a corresponding first grouping session such as session I/II/III according to the type of application data such as type A/B/C. The server device 500 similarly adds a corresponding second grouping session such as session I/II/III according to the type of data such as type A/B/C.

At operation C120, a terminal device 300 packages and sends the application data.

In an embodiment, when the terminal device has no application data for transmission, the terminal device 300 is in an off-network and dormant state. When the terminal device has application data to be reported, the terminal device 300 adds its own terminal identity identifier UE ID to the application data to be reported as the data entity to be transmitted. After that, the terminal device 300 reads the system broadcast and reports the application data along with the corresponding grouping feature identifiers to the network device 400.

At operation C130, the network device 400 collects data according to the grouping feature identifiers.

In an embodiment, for the interaction between a special terminal device and the network device 400, the application data reported by each special terminal device at one time belong to the same classification. Then, according to the grouping feature identifiers in the application data, the network device 400 can divide each application data reported by the terminal device 300 into a corresponding grouping and displace the data into the corresponding first grouping session for processing.

At operation C140, the network device 400 reports the application data to the server device 500.

In an embodiment, the network device 400 does not need to parse the application data collected in the first grouping session, to know the specific UE ID. Instead, the network device 400 directly reports the application data to the server device 500 according to the grouping granularity.

At operation C150, the server device 500 processes the application data sent by the network device 400.

In an embodiment, the server device 500 distributes the data reported by the network device 400 to the corresponding second grouping session according to the grouping feature identifier. Then, the grouping processing unit corresponding to each second grouping session further parses the content of the application data, thereby obtaining the UE IDs and specific data in the application data and determining the application data reported by the terminal device 300 of each UE ID.

It shall be noted that the network device 400 can be compatible with a special terminal device and an ordinary terminal device. In an embodiment, the ordinary terminal device obtains information from the system broadcast of the network device 400, and determines the time-frequency position of the initial radio resource of the ordinary terminal device, such as the time-frequency position in the PRACH. For the initial radio resources of a special terminal device, different radio resources are predefined and mapped according to different application data groupings. Since such radio resources are different from those in system broadcasting, the grouping types of application data preset by special terminal devices all have corresponding radio resource information. Therefore, according to the first information exchanged between the terminal device 300 and the network device 400, the network device 400 can quickly distinguish a special terminal device from an ordinary terminal device according to the radio resource information employed by the terminal device 300 for information transmission.

It shall be noted that rapid and efficient data collection is enabled between a special terminal device and the network device 400 through EDT. In an embodiment, a special terminal device is initially in an idle state, and before data transmission, such as periodically or driven by an event defined by the network device 400, the special terminal device sends the first information (i.e., the first message interacted between the corresponding terminal device 300 and the network device 400, with the radio universal label, "MSG1") from the corresponding radio resource to the PRACH according to the preset grouping type and the corresponding radio resource information. The network device 400 can quickly identify whether the terminal device 300 is a special terminal device from the time-frequency position of the PRACH resource, so as to quickly determine the type of data reported by the special terminal device for rapid processing. Then, the network device 400 sends the second information (i.e., the second message interacted between the corresponding terminal device 300 and the network device 400, with the radio universal label, "MSG2") according to the size of the data amount corresponding to the predefined type of different application data. The second information is employed to determine the size of the uplink granted data amount for the third information. Then, the special terminal device sends the third message (i.e., the third message interacted between the corresponding terminal device 300 and the network device 400, with the radio universal label, "MSG3") for data reporting according to the grant designation of MSG2. For standard protocols, this message will carry a first high-level signaling. The size of content that the third message can carry can be set to be larger than the carried high-level signaling, such as X Bytes, which can be controlled by the uplink granted size indicated in MSG2 sent by the network device 400. Thus, this part of the resources can be employed to carry the application data that is to be sent by a special terminal device. Then, the network device 400 sends the fourth information (i.e., the fourth message interacted between the corresponding terminal device 300 and the network device 400, with the radio universal label, "MSG4") to the terminal device 300. The fourth information can feed back whether the terminal device 300 wins in a conflict. For example, a UE which fails in a conflict will try again to send uplink data after a certain period of time. The selection of PRACH resources for retransmission can be further specially defined. Thereby, the timely transfer of the retransmitted data to the network device 400 is ensured.

It shall be noted that in the case that a special terminal device reports the application data through the EDT technology, when the application data report is completed, the terminal device 300 will receive MSG4 sent by the network device 400 as a confirmation. Then the terminal device will enter the idle state again without using the high-level timer like an ordinary terminal device. Therefore, since a special terminal device only needs to send uplink information and downlink monitoring during the EDT process, and the duration of the EDT process is relatively short, the energy consumption of the special terminal device is relatively low. Thus, the power consumption of the terminal device 300 can be reduced significantly.

It can be understood that according to the technical scheme set forth in an embodiment of the present disclosure, firstly, the capacity of the cell can be greatly increased. That is, more terminals can be supported in the same coverage area, especially in the scenario of low power consumption and huge connections of the terminal devices. The network is fully capable of supporting over 100 billion connections by grouping the terminal devices 300 and establishing grouping sessions with the base station, such that the number of deployed network devices 400 can be reduced and the cost can be reduced. Meanwhile, the terminal device 300 does not need to establish a bearer every time for data transmission. Instead, the terminal device 300 can complete the transmission of uplink data before completing the protocol stack, such that the network deployment is simplified and the power consumption is reduced. Secondly, the early transmission of uplink data with the help of a random-access procedure can greatly improve transmission efficiency. With respect to the application scenarios with the purpose of sensing and data acquisition, the method enables small data packets to be transmitted to the upper layer faster and improves efficiency. In addition, the method or system according to an embodiment of the present disclosure does not rely on support from additional devices, and is well compatible with the existing system, with low deployment cost. Further, additional network-side devices are not necessary to increase the supporting capacity of the terminal devices 300. At the same time, the cost reduction of the terminal device 300 and the network-side device is more favorable for the application of the method or the system. Finally, the method or system according to an embodiment of the present disclosure does not rely on large bandwidth support. Since the application data can be reported in the random-access procedure, a large number of time-frequency resources are not needed to establish the bearer. The network-side device and the terminal devices 300 do not need large system bandwidth to support the deployment of a huge number of terminal devices 300. In this way, valuable time-frequency resources are saved, which is of great significance in the 5G era.

The technical scheme of the present disclosure is illustrated below by way of three example embodiments, for a better understanding of the method for data transmission according to some embodiment of the present disclosure.

Example Embodiment One

Figure 17:
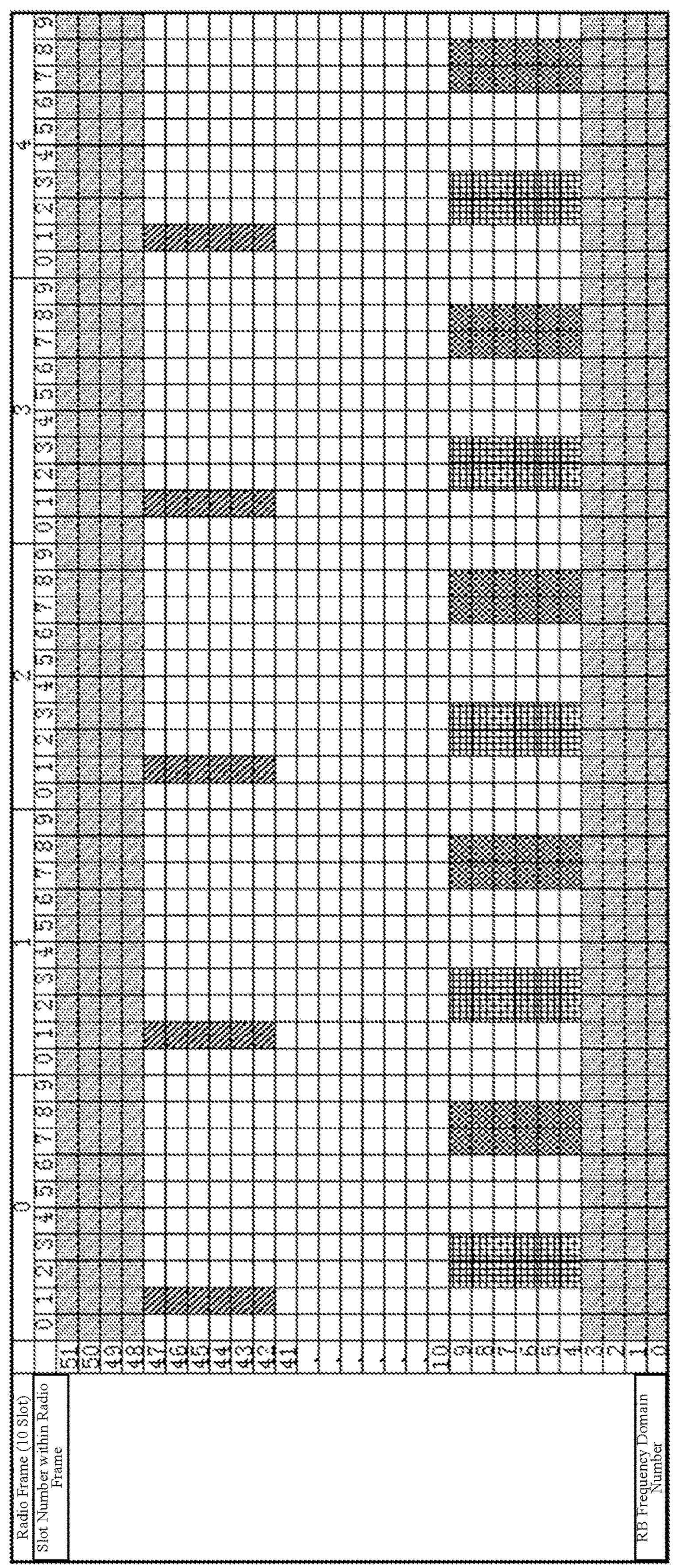
FIG. 17 depicts an example diagram showing the radio resources of a network device compatible with special terminal devices and ordinary terminal devices in a method for data transmission according to yet another embodiment of the present disclosure.

Referring to FIG. 17, which depicts an example diagram showing the radio resources of a network device compatible with special terminal devices and ordinary terminal devices in a method for data transmission according to yet another embodiment of the present disclosure. Illustrated below is the compatibility of the network device 400 with the special terminal devices and ordinary terminal devices in the method for data transmission with a 5G network taken for example.

At operation C210, first, it is provided that the original network device 400 is a 10M bandwidth cell with a subcarrier interval of 15 KHz. The network device 400 normally transmits the original system broadcast. An ordinary terminal device determines the time domain information for PRACH transmission according to the prach-ConfigurationIndex in the system broadcast (for example, index "16" corresponds to the first slot in 10 ms in the time domain and lasts for one slot), determines the frequency domain information (such as the 42nd RB) for PRACH transmission according to the msg1-FrequencyStart in the system broadcast and determines the value range of preambles for PRACH transmission (such as 0-55) according to the totalNumberOfRA-Preambles in the system broadcast.

At operation C220, then, the application data types (such as type A for temperature information/type B for pressure information) reported by the special terminal devices are determined. The time and frequency resources for PRACH transmission mapped to application data of types A and B are preset, and different values are taken from those in system broadcasting (such as the period is 10 slots, the initial slots are slots 2 and 7 respectively, last for 2 slots; and frequency domain RB is 4 for both types). The value of the preamble employed by PRACH mapped to types A and B can be the same as the range of system broadcasting (0~55). The amounts of data reported by a terminal device at one time for types A and B are denoted as M bytes and N bytes respectively. It is assumed that, special terminal devices 300 1-3 are present. It is preset that, the special terminal device 1 only reports data of type A, the special terminal device 2 reports data of both types A and B (time multiplexed), and the special terminal device 3 reports data of type B.

At operation C230, when the terminal device 300 is a special terminal device, at a certain moment, an example is taken where the application layer data (the new data transmission) is reported by the high layer of the special terminal device 2, and the application data belongs to the type B. The special terminal 2 prefixes the reported application data with the unique UE ID of the special terminal device 2 and padding, to achieve the application data of length N for report. Then, the special terminal device 2 selects a radio resource with a preamble (such as 0) within the broadcast preamble range (0~55) with a time domain period of 10 slots, the 7th slot from the time domain start and lasting for 2 slots, and a frequency domain RB start of 4 according to the new data transmission, for PRACH transmission.

At operation C240, when the terminal device 300 is an ordinary terminal device, the network device 400, when scheduling the uplink PUSCH for the ordinary terminal device, does not employ the RB4~9 resources of slot 2/6 employed by the special terminal device dedicated to the PRACH transmission during the EDT process of the special terminal device. When the network device 400 receives the PRACH transmission from the special terminal device 2 at slot 7 and the frequency domain RB start of 4, the network device 400 can quickly know that the currently accessing device is a special terminal device with data belonging to type B, and then carry out the collection of data of type B by interacting with the special terminal device.

Example Embodiment Two

Figure 18:
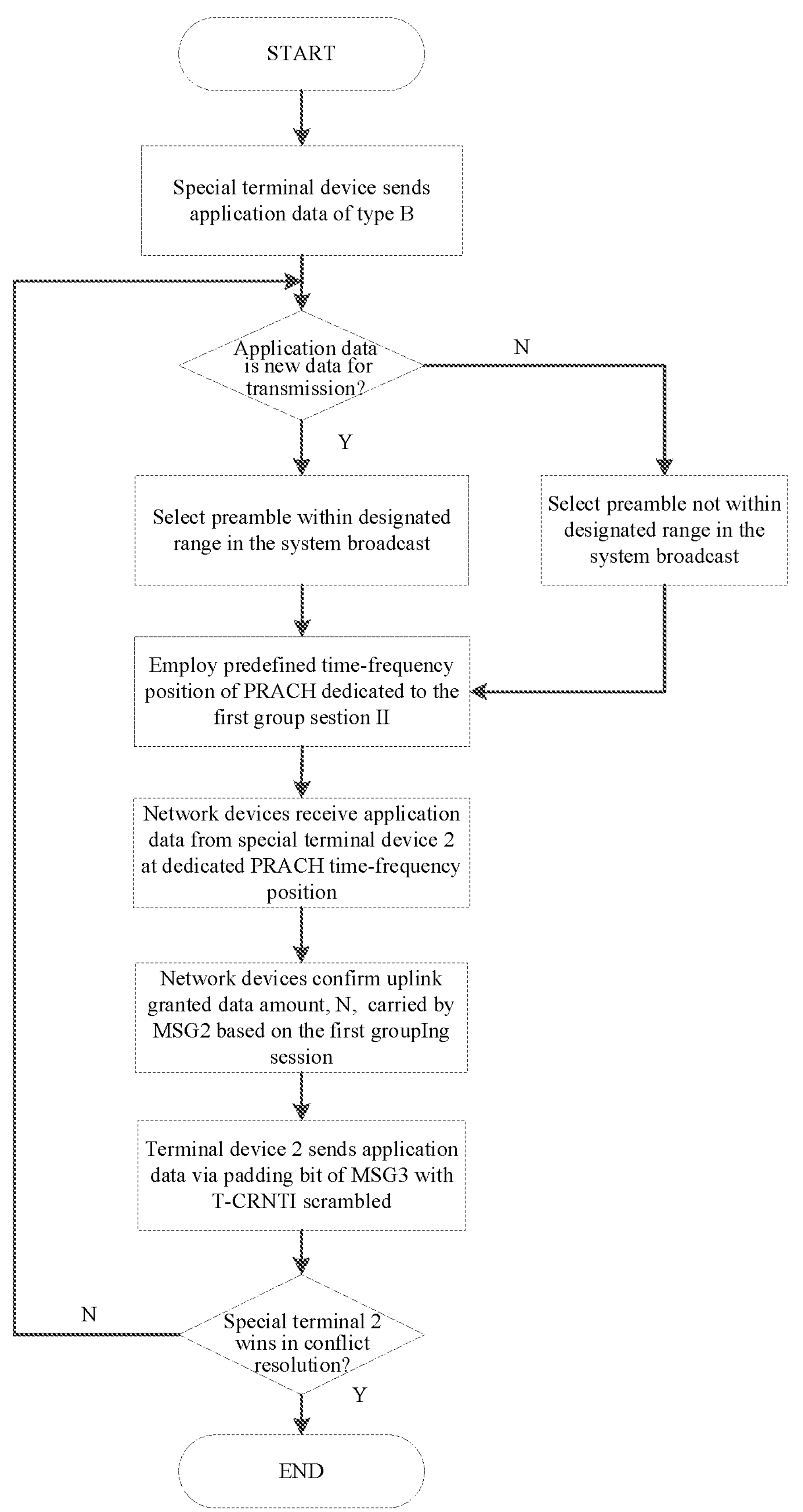
FIG. 18 depicts an example diagram showing the application of Early Data Transmission (EDT) technology in the method for data transmission according to another embodiment of the present disclosure.

Referring to FIG. 18, which depicts an example diagram showing the application of Early Data Transmission (EDT) technology in the method for data transmission according to another embodiment of the present disclosure. The EDT procedure of the terminal device 300 in the method for data transmission is illustrated by taking the 5G network as an example below.

At operation C310, at a certain moment when the special terminal device 2 reports the application layer data (new data transmission, and if the data is retransmitted data in a previously failed radio transmission, the process will directly go to operation C360), and the application data belongs to type B, the special terminal device 2 prefixes the application data to be reported with the unique UE ID of the special terminal device 2 and padding, so as to achieve the data with the length of N for report.

At operation C320, the special terminal device 2 reads the cell synchronization signal and broadcast information of the current coverage area, and obtains the information of the cell with the strongest signal (or preferentially selects a corresponding cell from the access cell list information preset in the terminal device 300). The special terminal device 2 obtains the broadcast information of the selected cell and radio resources, including the preamble range of the broadcast (for example, the preamble range of the cell broadcast is 0-55, and the remaining 55-63 are reserved for retransmission). The RA-RNTI is also divided into ordinary transmission and reserved parts.

At operation C330, the special terminal device 2 selects a preamble (such as 0) within the broadcast preamble range (0~55), selects the RA-RNTI for ordinary transmission, and selects the radio resource corresponding to the application data of type B (such as slot 7, radio resource of frequency domain RB start of 4) according to the new data transmission, for PRACH transmission.

At operation C340, when receiving the PRACH transmission of the special terminal device 2 in slot 7 and the frequency domain RB start of 4, the network device 400 can determine that the current special terminal device belongs to data of type B, interact with the UE by means of the first grouping session II (corresponding to the type B). Then, according to the granted size of N bytes corresponding to the preset application data of type B, MSG2 is fed back to the special terminal device, and the uplink granted data amount of the corresponding size is indicated, and the grant size, excluding the occupied length of high-level signaling, should be greater than N.

At operation C350, after the special terminal device 2 receives the uplink grant, the special terminal device 2 carries a C-RNTI MAC Control Element in MSG3, which contains the unique identifier (C-RNTI) of the UE. Since the conflict has not been resolved at this point, MSG3 is scrambled with TC-RNTI. Excluding the regular content of MSG3, the additional N bytes in the size of the uplink granted data amount can be employed by the special terminal device 2 to fill application data for report.

At operation C360, after the network device 400 receives the MSG3 reported by the special terminal device, if another special terminal device (such as the special terminal device 3) and the terminal device 2 were reporting the MSG3 with the same resources simultaneously, the network device 400 will carry the unique identifier in the MSG4 message to designate the winning special terminal device. If the special terminal device 2 wins, the procedure will go to operation C370, and if not, the procedure will go to operation C380.

At operation C370, if the special terminal device 2 wins in the conflict resolution, the network device 400 indicates in MSG4 that the special terminal device 2 wins, and places the application data with N bytes carried by the special terminal device 2 in MSG3 into the first grouping session II of the network device 400 for batch processing.

At operation C380, if the special terminal device 2 fails in the conflict resolution at operation C360, the procedure will go to the retransmission operation C390.

At operation C390, first, different retransmission intervals, and the number of retransmissions are adopted for different grouping data types (for example, the retransmission interval of temperature information of type A is 10 ms, and the number of retransmissions is 3 times; the retransmission interval of pressure information of type B is 20 ms, and the number of retransmissions is 5 times). In an example, the special terminal device 2 retransmits the application data of type B. In case that special terminal device 2 fails in the retransmission for three times, in order to prevent the special terminal device 2 from failing in the conflict resolution every time, the preamble which is not designated by the system broadcasting (in the example embodiment one, 55 to 63 are unused), can be used, or a reserved preamble can be specially designated, for example, 60 can be used. When random access is performed again, the network device 400 finds that there is a special terminal device with a preamble of 60 (within the reserved range of 55~63) and a reserved RA-RNTI, and then gives priority to the terminal device to win in the conflict resolution. If the preambles of two or more terminal devices are within the reserved range of 55~63 in a certain conflict resolution process, one of those terminal devices is randomly selected to win in the conflict resolution, and other terminal devices that fail in the conflict resolution have to select a preamble within the reserved range again for further access until the retransmission times of such data transmission are reached.

Example Embodiment Three

The type definition of application data and the process of data collection and reporting in the method for data transmission are as follows.

At operation C310, the application data to be collected from the special terminal devices are determined according to the practical networking requirements, and the application data are classified into two types, such as type A for temperature information data and type B for pressure information data.

At operation C320, it is confirmed that each type of application data collected by the network device 400 corresponds to a set of specific wireless protocol stack resources (the preset specific value is different from the radio resource value configured by the cell for ordinary users through broadcasting) according to the classification defined in operation C310, and the preset radio resource information includes but not limited to PRACH time-frequency domain code resources, MSG2/MSG3 allocated time-frequency resources and grant resources, as well as the retransmission times and physical resources after random access conflict. For example, radio resource X is preset for data of type A, and radio resource Y is preset for data of type B.

At operation C330, respective data aggregation method and parsing method are defined for each type of application data according to the classification of the application data determined at operation C310, including the configuration of the data aggregation method for each type of application data on the network device 400 and the configuration of the parsing method for each type of application data on the server device 500. For example, data of types A and B have their own data aggregation method and parsing method.

At operation C340, the network device 400 is initialized and interacts with the server device 500, obtains the type information of the application data and the corresponding radio resource information. The network device 400 can also directly configure the radio resource information for the corresponding grouping on the network management of the network device 400.

At operation C350, the network device 400 collects the application data according to the grouping feature identifier through the first grouping session in the way discussed in example embodiment one or two.

At operation C360, the first grouping session of the network device 400 aggregates the collected application data according to the aggregating scheme corresponding grouping, and reports the application data to the corresponding second grouping session of the server device 500 after aggregation.

At operation C370, the server device 500 parses the session according to the predefined parsing method. One of the ways is as follows. The second grouping session of the server device 500 further parses the collected data according to the data length (such as N) specified for the grouping, and parses the UE ID and application data to which the data belongs, so that the data reported for each UE ID can be accurately determined.

Based on the method for data transmission in the embodiments of the first, second and third aspects described above, embodiments of the network device 400 in the fourth aspect, the terminal device 300 in the fifth aspect, the server device 500 in the sixth aspect and the computer-readable storage medium in the seventh aspect of the present disclosure are set forth below.

According to an embodiment of the present disclosure, a network device 400 is provided, which includes a memory 100, a processor 200, and a computer program stored in the memory 100 and executable by the processor 200.

The processor 200 and the memory 100 may be connected by a bus or other means.

It should be noted that the network device 400 in this embodiment can correspondingly include the memory 100 and the processor 200 in the embodiment shown in FIG. 1, and can form a part of the system architecture platform in the embodiment shown in FIG. 1, both of which belong to the same inventive concept, so they have the same realization principle and beneficial effects, and will not be described in detail here.

Non-transitory software programs and instructions of the method for data transmission described in the above embodiments are stored in a memory 100 which, when executed by a processor 200, causes the processor 200 to carry out operations of the method of the first aspect of the present disclosure as described above, for example, the above-described operations S100 to S300 described in conjunction with FIGS. 3, S110 to S120 described in conjunction with FIG. 4, S130 described in conjunction with FIGS. 5, S131 to S133 described in conjunction with FIG. 6, S210 described in conjunction with FIG. 7, S140 described in conjunction with FIG. 8, or S310 described in conjunction with FIG. 9.

It can be understood that since the network device 400 of the embodiment in the fourth aspect of the present disclosure is configured to carry out the method for data transmission including any of the above embodiments of the first aspect of the present disclosure, the specific implementation and technical effects of the network device 400 can refer to the specific implementation and technical effects of the method for data transmission of any of the above embodiments of the first aspect of the present disclosure, and which will not be repeated here.

The above-described device embodiments are only illustrative, in which the units illustrated as separate components may or may not be physically separated, that is, they may be located in one place or distributed over several network units. Some or all of the modules can be selected according to the practical needs to achieve the purpose of this embodiment.

According to an embodiment of the present disclosure, there is provided a terminal device 300, which includes a memory 100, a processor 200, and a computer program stored in the memory 100 and executable by the processor 200.

The processor 200 and the memory 100 may be connected by a bus or other means.

It should be noted that the terminal device 300 in this embodiment can correspondingly include the memory 100 and the processor 200 in the embodiment shown in FIG. 1, and can form a part of the system architecture platform in the embodiment shown in FIG. 1, both of which belong to the same inventive concept, so they have the same realization principle and beneficial effects, and will not be described in detail here.

Non-transient software programs and instructions required to realize the data transmission method of the above-mentioned embodiment are stored in the memory 100, and when executed by the processor 200, the data transmission method of the second aspect of the present disclosure as described above is carried out, for example, the above operation S400 described in conjunction with FIG. 10, the above operation S410 described in conjunction with FIG. 11, the above operations S411 to S413 described in conjunction with FIG. 12, or the above operation S420 described in conjunction with FIG. 13.

It can be understood that since the terminal device 300 of the embodiment in the fifth aspect of the present disclosure is configured to carry out the method for data transmission including any of the above embodiments in the second aspect, the specific implementation and technical effects of the terminal device 300 can refer to the specific implementation and technical effects of the method for data transmission of any of the above embodiments in the second aspect, and which will not be repeated here.

The above-described device embodiments are only illustrative, in which the units illustrated as separate components may or may not be physically separated, that is, they may be located in one place or distributed over several network units. Some or all of the modules can be selected according to the practical needs to achieve the purpose of this embodiment.

According to a sixth aspect of the present disclosure, there is provided a terminal device 300, which includes a memory 100, a processor 200, and a computer program stored in the memory 100 and executable by the processor 200.

The processor 200 and the memory 100 may be connected by a bus or other means.

It should be noted that the terminal device 300 in this embodiment can correspondingly include the memory 100 and the processor 200 in the embodiment shown in FIG. 1, and can form a part of the system architecture platform in the embodiment shown in FIG. 1, both of which belong to the same inventive concept, so they have the same realization principle and beneficial effects, and will not be described in detail here.

Non-transient software programs and instructions required to realize the data transmission method of the above-mentioned embodiment are stored in the memory 100, and when executed by the processor 200, the method for data transmission of the third aspect of the present disclosure as described above is carried out, for example, the above operations S500 to S600 described in conjunction with FIG. 14, or the above operations S610 to S620 described in conjunction with FIG. 15.

It can be understood that since the terminal device 300 of the embodiment in the sixth aspect of the present disclosure is configured to carry out the method for data transmission including any of the above embodiments of the third aspect, the specific implementation and technical effects of the network device 300 can refer to the specific implementation and technical effects of the method for data transmission of any of the above embodiments of the third aspect, and which will not be repeated here.

The above-described device embodiments are only illustrative, in which the units illustrated as separate components may or may not be physically separated, that is, they may be located in one place or distributed over several network units. Some or all of the modules can be selected according to the practical needs to achieve the purpose of this embodiment.

According to yet another embodiment of the present disclosure, there is provided a computer-readable storage medium, which stores computer-executable instructions which, when executed by a processor, causes the processor to carry out the operations of the method described above, for example, the above operations S100 to S300 described in conjunction with FIGS. 3, S110 to S120 described in conjunction with FIG. 4, S130 described in conjunction with FIGS. 5, S131 to S133 described in conjunction with FIG. 6, S210 described in conjunction with FIG. 7, S140 described in conjunction with FIG. 8, S310 described in conjunction with FIG. 9, S400 described in conjunction with FIG. 10, S410 described in conjunction with FIGS. 11, S411 to S413 described in conjunction with FIG. 12, S420 described in conjunction with FIGS. 13, S500 to S600 described in conjunction with FIG. 14, or S610 to S620 described in conjunction with FIG. 15.

It shall be appreciated by a person having ordinary skills in the art that all or some of the steps and systems disclosed above can be implemented as software, firmware, hardware, and their appropriate combinations. Some or all physical components can be implemented as software executed by a processor 200, such as a central processor 200, a digital signal processor 200, or a microprocessor 200, or as hardware, or as an integrated circuit, such as an application-specific integrated circuit. Such software can be distributed on computer-readable media, which can include computer storage media (or non-transitory media) and communication media (or transitory media). As is well known to a person having ordinary skills in the art, the term computer storage medium includes volatile and nonvolatile, removable and non-removable medium implemented in any method or technology for storing information such as computer-readable instructions, data structures, program modules, or other data. Computer storage medium includes but is not limited to, RAM, ROM, EEPROM, flash memory or other memory technologies, CD-ROM, digital versatile disks (DVD) or other optical disk storage, magnetic boxes, tapes, magnetic disk storage or other magnetic storage devices, or any other medium that can be configured to store desired information and accessible by a computer. Furthermore, it is well known to a person having ordinary skills in the art that communication media usually contains computer-readable instructions, data structures, program modules, or other data in modulated data signals such as carrier waves or other transmission mechanisms, and can include any information delivery media.

Provided are a method for data transmission, a network device, a terminal device, a server device and a computer-readable storage medium in some embodiments of the present disclosure. The method for data transmission is applied to a network device in a communicative connection with a plurality of terminal devices and a server device. The method includes, receiving application data sent by a terminal device among the terminal devices; where the application data corresponds to a grouping feature identifier among a plurality of grouping feature identifiers; determining a corresponding first grouping session among a plurality of first grouping sessions in the network device according to the grouping feature identifier; where each of the first grouping sessions corresponds to a respective one of the grouping feature identifiers; and sending the application data to the first grouping session, and sending the application data in the first grouping session to a corresponding second grouping session among a plurality of second grouping sessions in the server device, such that the server device processes the application data; where each of the second grouping sessions corresponds to a respective one of the first grouping sessions. According to the scheme set forth in an embodiment of the present disclosure, the application data of the terminal device is sent to the second grouping session of the server device through the first grouping session of the network device according to the grouping feature identifier. As such, the network-side device only needs to maintain the first grouping sessions and the second grouping sessions including a plurality of application data without establishing a session for each terminal device. Thus, the amount of sessions maintained in the network-side devices are reduced, such that the accessing of more terminal devices can be supported by the network-side devices, and the deployment cost of the terminal devices and the network-side devices are reduced. In addition, the server device can process the application data according to the second grouping session corresponding to the grouping feature identifier, thus realizing the rapid data collection from a large number of terminal devices.

Described above is a description of several embodiments of the present disclosure, but the present disclosure is not limited to the above embodiments. Those having ordinary skills in the art can make various equivalent modifications or substitutions without departing the scope of the present disclosure, and these equivalent modifications or substitutions are within the scope defined by the claims of the present disclosure.

What is claimed is:

1. A method for data transmission, applied to a network device in communicative connection with a plurality of terminal devices and a server device, the method comprising, receiving application data sent by a terminal device among the plurality of terminal devices; wherein the application data corresponds to a grouping feature identifier among a plurality of grouping feature identifiers;

determining a corresponding first grouping session among a plurality of first grouping sessions in the network device according to the grouping feature identifier; wherein each of the plurality of first grouping sessions corresponds to a respective one of the grouping feature identifiers; and sending the application data to the first grouping session, and sending the application data in the first grouping session to a corresponding second grouping session among a plurality of second grouping sessions in the server device, such that the server device processes the application data; wherein each of the plurality of second grouping sessions corresponds to a respective one of the plurality of first grouping sessions.

2. The method according to claim 1, wherein before receiving the application data sent by the terminal device, the method further comprises one of, acquiring configuration information carrying the plurality of grouping feature identifiers, and generating the plurality of first grouping sessions each corresponding to a respective one of the grouping feature identifiers according to the configuration information; or acquiring session information that is indicative of the plurality of second grouping sessions in the server device, and generating the plurality of first grouping sessions each corresponding to a respective one of the plurality of second grouping sessions according to the session information;

wherein the plurality of second grouping sessions are generated by the server device according to the grouping feature identifiers in the configuration information, and each of the plurality of second grouping sessions corresponds to a respective one of the grouping feature identifiers.

3. The method according to claim 1, wherein receiving the application data sent by the terminal device comprises, receiving the application data sent by the terminal device through a physical random-access procedure.

4. The method according to claim 3, wherein receiving the application data sent by the terminal device through the physical random-access procedure comprises, receiving first information from the terminal device, and determining the grouping feature identifier of the terminal device according to a time-frequency position where the first information is present;

generating second information based on the time-frequency position, and sending the second information to the terminal device; wherein the second information is indicative of an uplink granted data amount of the application data; and generating fourth information according to third information, in response to a reception of the third information carrying the application data sent by the terminal device based on the second information, and sending the fourth information to the terminal device, to cause the terminal device to transition to an idle state;

wherein the fourth information is indicative of a success in receiving the application data by the network device.

5. The method according to claim 4, wherein determining the corresponding first grouping session in the network device according to the grouping feature identifier comprises, determining the corresponding first grouping session in the network device according to the grouping feature identifier, in response to a presence of correspondence between the time-frequency position and a preset time-frequency position.

6. The method according to claim 4, wherein after receiving the application data sent by the terminal device, the method further comprises, sending the application data to a Public Data Network (PDN) device, in response to a lack of correspondence between the time-frequency position and a preset time-frequency position.

7. The method according to claim 1, wherein each of the plurality of terminal devices has a respective terminal device identity identifier, and the application data carries the terminal device identity identifier corresponding to the terminal device; and sending the application data to the first grouping session and sending the application data in the first grouping session to the corresponding second grouping session in the server device, such that the server device processes the application data, comprises, sending the application data to the first grouping session, and sending the application data in the first grouping session to the corresponding second grouping session in the server device, such that the server device parses the application data to obtain the terminal device identity identifier, and determines the terminal device corresponding to the application data, among the plurality of terminal devices, according to the terminal device identity identifier and the grouping feature identifier.

8. A method for data transmission, applied to a terminal device among a plurality of terminal devices in communicative connection with a server device through a network device, the method comprising, sending application data corresponding to a grouping feature identifier among a plurality of grouping feature identifiers to the network device, such that the network device determines a corresponding first grouping session among a plurality of first grouping sessions in the network device according to the grouping feature identifier, and sends the application data to the first grouping session, and such that the network device sends the application data in the first grouping session to a corresponding second grouping session among a plurality of second grouping sessions in the server device, such that the server device processes the application data;

wherein each of the plurality of first grouping sessions corresponds to a respective one of the grouping feature identifiers, and each of the plurality of second grouping sessions corresponds to a respective one of the plurality of first grouping sessions.

9. The method according to claim 8, wherein sending the application data corresponding to the grouping feature identifier to the network device comprises, sending the application data corresponding to the grouping feature identifier to the network device through a physical random-access procedure.

10. The method according to claim 9, wherein sending the application data corresponding to the grouping feature identifier to the network device through the physical random-access procedure comprises, sending first information to the network device; wherein the first information is employed to determine a time-frequency position in a Physical Random-Access Channel (PRACH) assigned to the terminal device, and the time-frequency position is employed to determine the grouping feature identifier of the terminal device;

receiving second information fed back by the network device; wherein the second information is fed back by the network device based on the first information, and the second information is indicative of an uplink granted data amount of the application data;

sending third information to the network device based on the second information; wherein the third information carries the application data; and receiving fourth information fed back by the network device based on the third information, and entering an idle state according to the fourth information;

wherein the fourth information is indicative of a success in receiving the application data by the network device.

11. The method according to claim 8, wherein each of the plurality of terminal devices has a respective terminal device identity identifier, and the application data carries the terminal device identity identifier corresponding to the terminal device; and sending the application data corresponding to the grouping feature identifier among the plurality of grouping feature identifiers to the network device, such that the network device determines the corresponding first grouping session among the plurality of first grouping sessions in the network device according to the grouping feature identifier, and sends the application data to the first grouping session, and such that the network device sends the application data in the first grouping session to the corresponding second grouping session among the plurality of second grouping sessions in the server device, such that the server device processes the application data, comprises, sending the application data corresponding to the grouping feature identifier to the network device, such that the network device determines the corresponding first grouping session in the network device according to the grouping feature identifier and sends the application data to the first grouping session, and such that the network device sends the application data in the first grouping session to the corresponding second grouping session in the server device, such that the server device parses the application data to obtain the terminal device identity identifier, and determines the terminal device corresponding to the application data, among the plurality of terminal devices, according to the terminal device identity identifier and the grouping feature identifier.

12. A method for data transmission, applied to a server device in communicative connection with a plurality of terminal devices through a network device, the method comprising:

receiving application data in a first grouping session among a plurality of first grouping sessions from the network device;

wherein the application data is sent by the terminal device and corresponds to a grouping feature identifier among a plurality of grouping feature identifiers, and each of the plurality of first grouping sessions corresponds to a respective one of the grouping feature identifiers; and sending the application data to a second grouping session among a plurality of second grouping sessions, the second grouping session corresponding to the first grouping session, and processing the application data; wherein each of the plurality of second grouping sessions corresponds to a respective one of the plurality of first grouping sessions.

13. The method according to claim 12, wherein each of the plurality of terminal devices has a respective terminal device identity identifier, and the application data carries the terminal device identity identifier corresponding to the terminal device; and processing the application data comprises, parsing the application data to obtain the terminal device identity identifier; and determining the terminal device corresponding to the application data, among the plurality of terminal devices, according to the terminal device identity identifier and the grouping feature identifier.

14. A network device, comprising a memory, a processor, and a computer program stored in the memory and executable by the processor which, when executed by the processor causes the processor to carry out the method as claimed in claim 1.

15. A terminal device, comprising a memory, a processor, and a computer program stored in the memory and executable by the processor which, when executed by the processor causes the processor to carry out the method as claimed in claim 8.

16. A server, comprising a memory, a processor, and a computer program stored in the memory and executable by the processor which, when executed by the processor causes the processor to carry out the method as claimed in claim 12.

17. A non-transitory computer-readable storage medium storing a computer-executable instruction which, when executed by a processor, causes the processor to carry out the method as claimed in claim 1.

18. A non-transitory computer-readable storage medium storing a computer-executable instruction which, when executed by a processor, causes the processor to carry out the method as claimed in claim 8.

19. A non-transitory computer-readable storage medium storing a computer-executable instruction which, when executed by a processor, causes the processor to carry out the method as claimed in claim 12.

* * * * *